Patented June 1, 1937

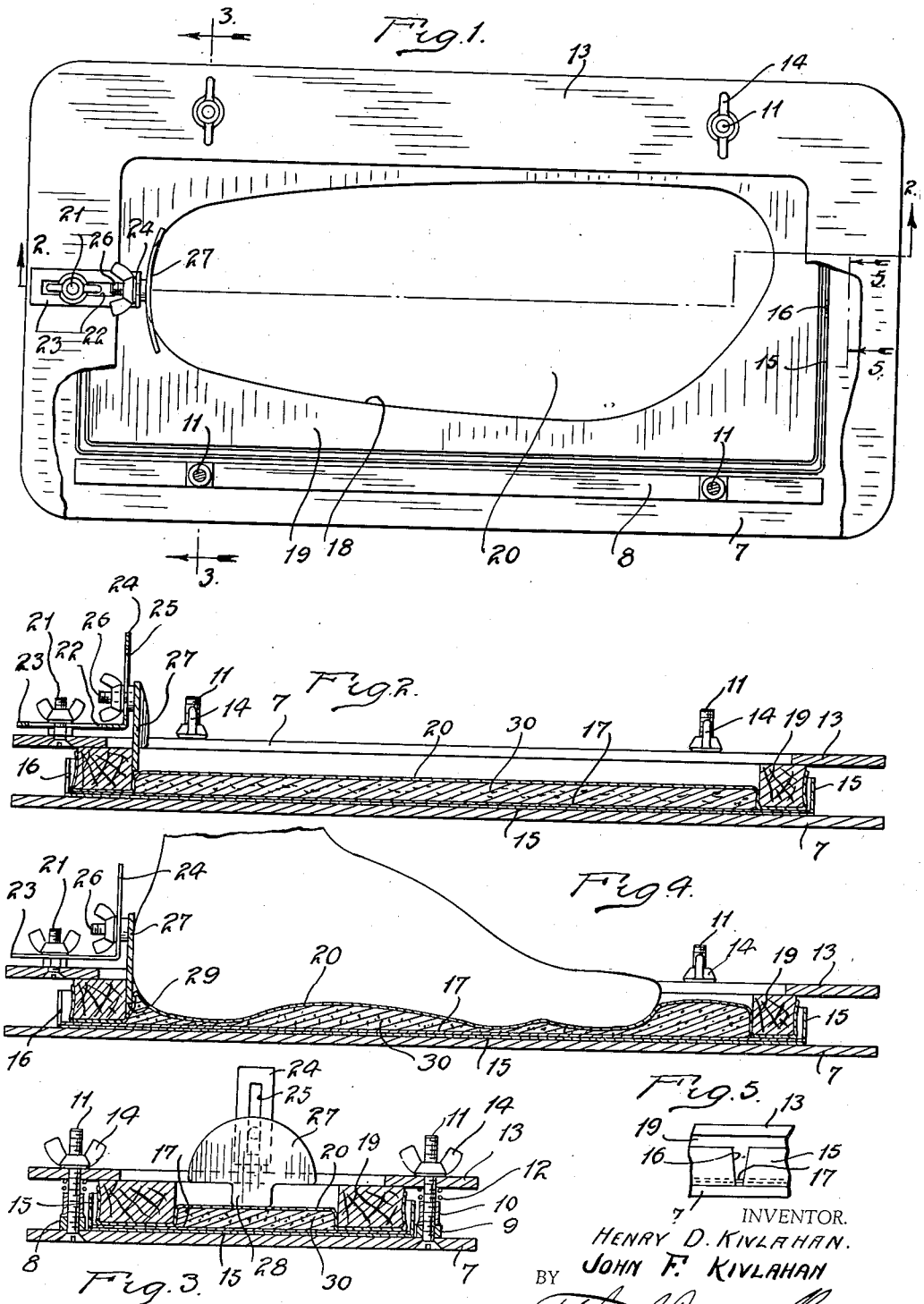

2,082,451

UNITED STATES PATENT OFFICE 2,082,451

PLASTIC IMPRESSION DEVICE

Henry D. Kivlahan and John F. Kivlahan, Highland Park, Mich.

Application May 27, 1935, Serial No. 23,631

4 Claims. (Cl. 18—5)

Our invention relates to a new and useful improvement in a plastic impression device adapted for use primarily in taking an impression of a person's foot so as to provide a means for accurately building up a suitable support for the foot in order to correct imperfections and deformities of it.

To accomplish this is one of the objects of the invention and another object of this invention is to provide a device of this class which will be simple in structure, economical of manufacture, durable and highly efficient in use.

Another object of the invention is the provision of a device whereby plastic material may be used as an impression medium and whereby the pressure may be placed thereon by the part of which it is desired to form an impression while the part placed thereon will not come directly into contact with the plastic material.

Another object of the invention is the provision of a device whereby a plastic impression may be obtained of the foot or other part of the body and a starting point or location point simultaneously formed in the cast.

Another object of the invention is the provision of a device of this kind in which a quantity of plastic material may be present for impression-receiving purposes and prevented from unduly flowing out from under the object pressed thereon.

Other objects will appear hereinafter.

The invention consists in the arrangement and combination of parts hereinafter described and claimed.

The invention will be best understood by a reference to the accompanying drawing which forms a part of this specification, and in which, Fig. 1 is a top plain view of the invention with parts broken away.

Fig. 2 is a sectional view taken on line 2—2 of Fig. 1.

Fig. 3 is a sectional view taken on line 3—3 of Fig. 1.

Fig. 4 is a sectional view similar to Fig. 2 showing the device in use.

Fig. 5 is a fragmentary, side, elevational view taken on line 5—5 of Fig. 1.

The device comprises a base plate 7 extending longitudinally of which, spaced inwardly from the edges thereof, are guide ribs 8 and 9. Projecting upwardly from these ribs 8 and 9 at opposite ends are the tubular sleeves 10 through which project screws 11. Embracing each of the screws 11 and resting with the lower end thereof engaging the upper end of the sleeve 10, is a spring 12. A clamping frame 13 is provided through which the screws 11 are adapted to project and threaded on each of the screws 11 is a wing nut 14.

The construction is such that when the wing nuts are loosened and the frame rests upon the upper ends of the springs 12, this frame will be elevated and held in spaced relation from the base plate 7 sufficient distance for permitting the sliding of the plastic pan and templet into position to receive the plastic material which may be plaster of Paris or the like. We provide a pan 15 which is cut away at its end walls as at 16. Resting on the bottom of the pan is a separable plate 17 and on to this plate is poured a mound of plastic material in position to register with the opening 18 formed in the templet 19 when the same is positioned in the pan 15. This templet is formed of such size as to fit loosely in the pan while substantially filling the same. It is preferably of such thickness as to project slightly above the upper edge of the pan as clearly appears in Fig. 2. The opening 18 formed in this templet is of such size and shape as to accommodate a person's foot. Secured to the templet 19 and extending along the under surface thereof is a line 20 of flexible material and preferably of water-proof material such as rubber or the like. When the deposit of plastic material is made upon the separable plate 17 which is positioned in the pan and the templet 19 placed in position, the flexible covering 20 will be bulged upwardly at the opening 18. The pan may then be inserted into position between the base plate 7 and the clamping frame 13 and clamped between these parts by threading the wing nuts 14 downwardly.

A stud or screw 21 is secured to the frame 7 and projects upwardly therefrom so as to extend through the elongated slot 22 formed in the horizontally-disposed part 23 of the L-shaped bracket. The vertically-disposed part 24 of this bracket is also provided with an elongated slot 25 through which extends the screw 26 which is carried by the heel plate 27. This heel plate is provided at its lower edge with a depending tongue 28. These screws 26 and 21 are each provided with a wing nut so that the heel plate 27 may be moved inwardly of the opening 18 by loosening the wing nut on the stud 21 and sliding the heel plate to the proper position. This heel plate may also be moved vertically by loosening the wing nut on the stud 26. In the use of the device, after the deposit of the plastic material on the removable plate 17 which is positioned in the pan 15, and a deposit of the templet or panel frame 19 in the pan and clamping the device between the clamping frame and the base, the person's foot would be placed in the opening 18, with the heel pressed firmly against the heel plate. Upon pressure being placed upon the foot the plastic material would be forced to spread out beneath the foot so as to entirely cover the portion of the plate 17 upon which the pressure of the foot would be directed. The flexible member 20 will, of course, respond to this pressure and yield wherever necessary. A part of the plastic material will be forced upwardly to the rear of the heel toward the high point, that is the point of the heel which rests against the heel plate 27. Consequently, the plastic material will rise above the edge of the tongue 28 which will form an impression as at 29 in the plastic cast. This line which is formed in the plastic cast by the lower edge of the tongue 28 may be determined the location mark or the heel location mark and serve as a starting point for the mechanic when using the cast. Any imperfections of the foot will be readily impressed upon the plastic material 30. After the impression, the plastic material is permitted to harden and then the pan 15 together with the templet 19 is removed. The templet 19 may be raised upwardly from the cast and then the cast itself may be removed together with the plate 17 whereupon the process may be repeated for the other foot. Since the imperfections of the foot will be impressed in the cast, a skilled operator examining the cast would be able to build up a suitable inner sole or foot supporting device, which would be absolutely accurate to the individual's needs. For instance, if there is a falling of the metatarsal bones too deep an impression would be formed in the plastic cast and the operator would clearly understand that the supporting device which is to be used under the foot must be built up at such points. Similarly, should there be a falling of the bones at any part of the foot or a dislocation of the bones, this showing or dislocation would be indicated in the cast and the operator would readily understand that a building up of the foot supporting device at these points would be required. By having the line 29 as a starting point, the operator can accurately build up the supporting device to fit the individual's foot without the slightest variations or departures.

In this way, therefore, we have provided a device which will serve as a means for taking an impression of a foot and serve as an indicator of the imperfections of the foot while at the same time provide a pattern or form from which the corrective device may build up to accurately fit the foot.

It will be noted that the flexible covering 20 is secured to the end faces and side faces of the templet or panel frame 19 so that a squeezing of the plastic material outwardly into contact with the foot is prevented. When the flexible covering 20 is made from a water-proof material such impressions may be taken of the foot while the person is wearing a stocking or sock. It is believed obvious that the device may be very easily and quickly assembled for an operation and that the taking of a foot impression becomes a very simple procedure.

It will also be noted that taking an impression in this manner is very much different than taking an impression of a person's foot by use of a carbon paper or the like, as the plastic material will flow upwardly and fill such spaces as may be left beneath the sole of a person's foot when the weight is placed thereon. Consequently, this method of taking an impression will be far superior to any flat method.

While we have illustrated and described the preferred form of structure of our invention, we do not wish to limit ourselves to the precise details of structure shown, but desire to avail ourselves of such variations and modifications as may come within the scope of the appended claims.

Having thus described our invention, what we claim as new and desire to secure by Letters Patent is:

1. A device of the class described comprising: a base; a frame mounted on and spaced from said base; a pan slideable on said base between said base and said frame; a templet positioned in said pan; means for clamping said templet between said base and said frame, said templet having an opening formed therein; a flexible covering for said opening extending on the under face of said templet.

2. A foot impression device of the class described comprising: a templet having an opening for the reception of a foot; a flexible covering for said opening at one face of said templet; means for restraining the passage of plastic material out of said opening when placed beneath said covering and upon the pressure of a foot being exerted upon said covering; and means for marking in said plastic material a rear-most point of the heel of the foot pressed thereon.

3. A device for taking an impression of a foot comprising: a member adapted for the reception of a mass of plastic material; a templet having an opening formed therein for the reception of a foot; a flexible covering for said opening at one face of said templet; said templet being adapted for positioning upon said member over said mass; means for restraining the flow of said mass from beneath said flexible covering upon the pressure of a foot being placed upon said flexible covering; and means for impressing on said mass a mark indicating the rear-most part of the heel of the foot.

4. A device for taking the impression of a foot comprising: a member adapted for the reception of a mass of plastic material; a templet positioned upon said member and having an opening overlying said mass; a flexible covering for said opening and pressable against said mass for forming therein an impression of the foot pressed thereon; means for maintaining said templet in engagement with said member sufficiently for preventing flow of said plastic material outwardly of said opening between said member and said templet; and a heel engaging member for impressing on said mass a mark indicating the rear-most point of the heel.

HENRY D. KIVLAHAN.
JOHN F. KIVLAHAN.